(12) United States Patent
McFall et al.

(10) Patent No.: US 7,947,921 B2
(45) Date of Patent: May 24, 2011

(54) ELECTRIC WIRE INSULATION CENTER STRIPPING METHOD AND DEVICE

(75) Inventors: Robert A. McFall, West Farmington, OH (US); Jeffrey M. Hickox, Middlefield, OH (US); Andrew F. Rodondi, Sharpsville, PA (US)

(73) Assignee: Delphi Technologies, Inc., Troy, MI (US)

( * ) Notice: Subject to any disclaimer, the term of this patent is extended or adjusted under 35 U.S.C. 154(b) by 1241 days.

(21) Appl. No.: 11/589,370

(22) Filed: Oct. 30, 2006

(65) Prior Publication Data
US 2008/0098598 A1 May 1, 2008

(51) Int. Cl.
B23K 26/38 (2006.01)
B26D 3/08 (2006.01)
B23P 19/04 (2006.01)
(52) U.S. Cl. .................. 219/121.69; 29/759; 83/879
(58) Field of Classification Search .............. 29/564.4, 29/759, 760, 426.4; 81/9.51, 9.4; 83/861, 83/870, 879; 219/121.68, 121.69; 140/71 R, 140/93 R
See application file for complete search history.

(56) References Cited

U.S. PATENT DOCUMENTS

| | | | |
|---|---|---|---|
| 3,953,706 A | 4/1976 | Harris et al. | |
| 4,124,965 A * | 11/1978 | Stahl | 53/412 |
| 4,671,848 A | 6/1987 | Miller et al. | |
| 4,761,535 A | 8/1988 | Lawson | |
| 4,931,616 A | 6/1990 | Usui et al. | |
| 5,085,114 A * | 2/1992 | DeRoss et al. | 81/9.51 |
| 5,465,637 A * | 11/1995 | Konen et al. | 81/9.51 |
| 5,837,961 A * | 11/1998 | Miller | 219/121.68 |
| 5,935,465 A | 8/1999 | Cardineau et al. | |
| 6,326,587 B1 | 12/2001 | Cardineau et al. | |
| 6,509,547 B1 | 1/2003 | Bernstein et al. | |
| 6,603,094 B2 | 8/2003 | Miller | |

FOREIGN PATENT DOCUMENTS

JP 2001-119829 A * 4/2001
JP 2001-309521 A * 11/2001

OTHER PUBLICATIONS

Machine translation of Japan Patent No. 2001-119,829, Feb. 2010.*
Machine translation of Japan Patent No. 2001-309,521, Jun. 2004.*

* cited by examiner

*Primary Examiner* — Geoffrey S Evans
(74) *Attorney, Agent, or Firm* — Thomas N. Twomey

(57) ABSTRACT

An insulated electric wire having a conductive core and an insulation jacket is center stripped by cutting a pattern in one side of the insulation jacket with a laser beam, and then cutting a coordinated pattern in an opposite side of the insulation jacket with a laser beam to produce two axially spaced circumferential cuts connected by a plurality of generally axial cuts that define at least two removeable insulation slugs for exposing the conductive core while the insulation jacket on either side of the exposed conductive core is left intact. An in-line center stripping device or a multiple wire rotation device may be used for center stripping the insulated electric wire. The insulated slugs may by removed by an insulation removal device on an offal removal assembly.

5 Claims, 6 Drawing Sheets

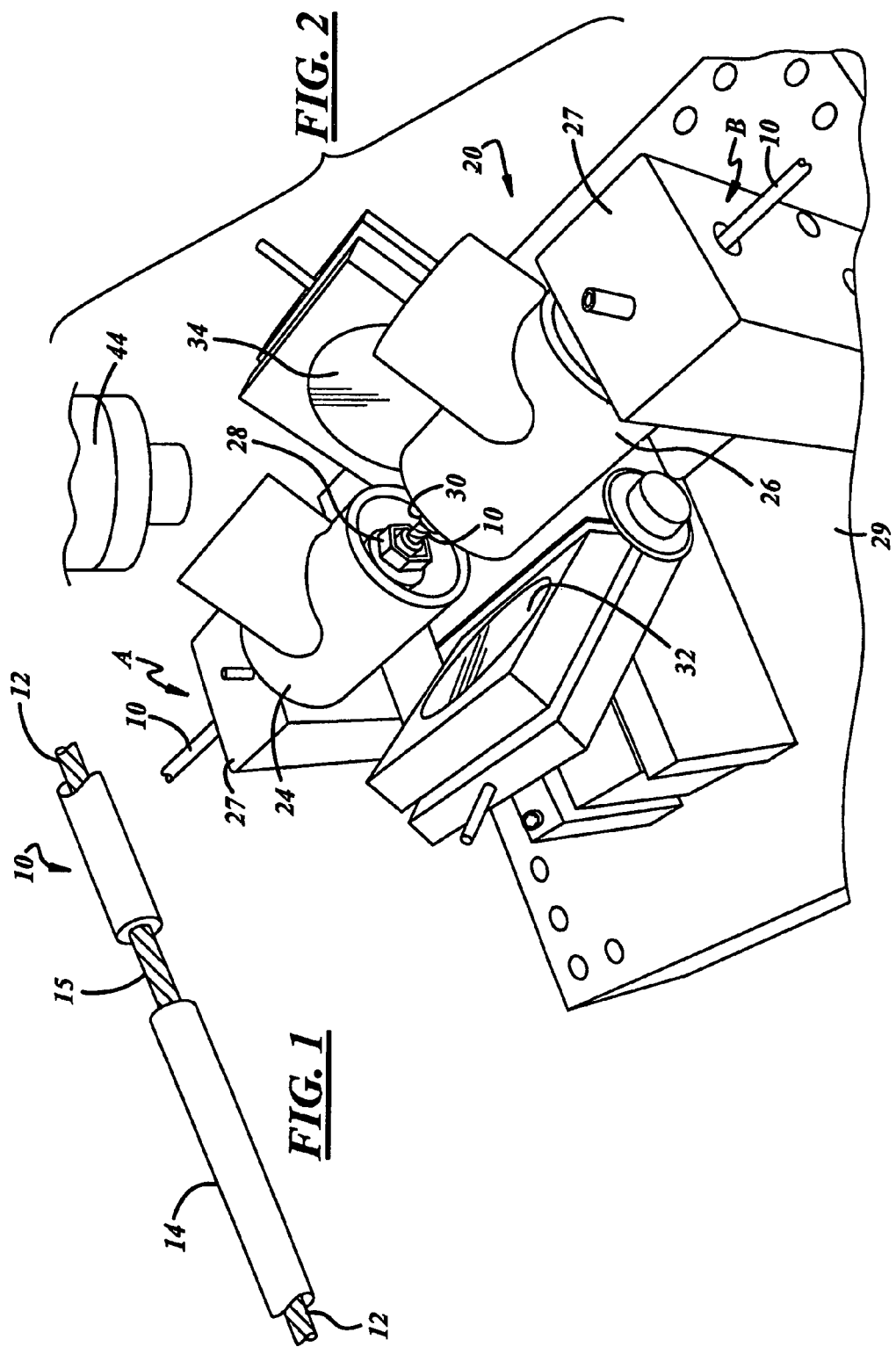

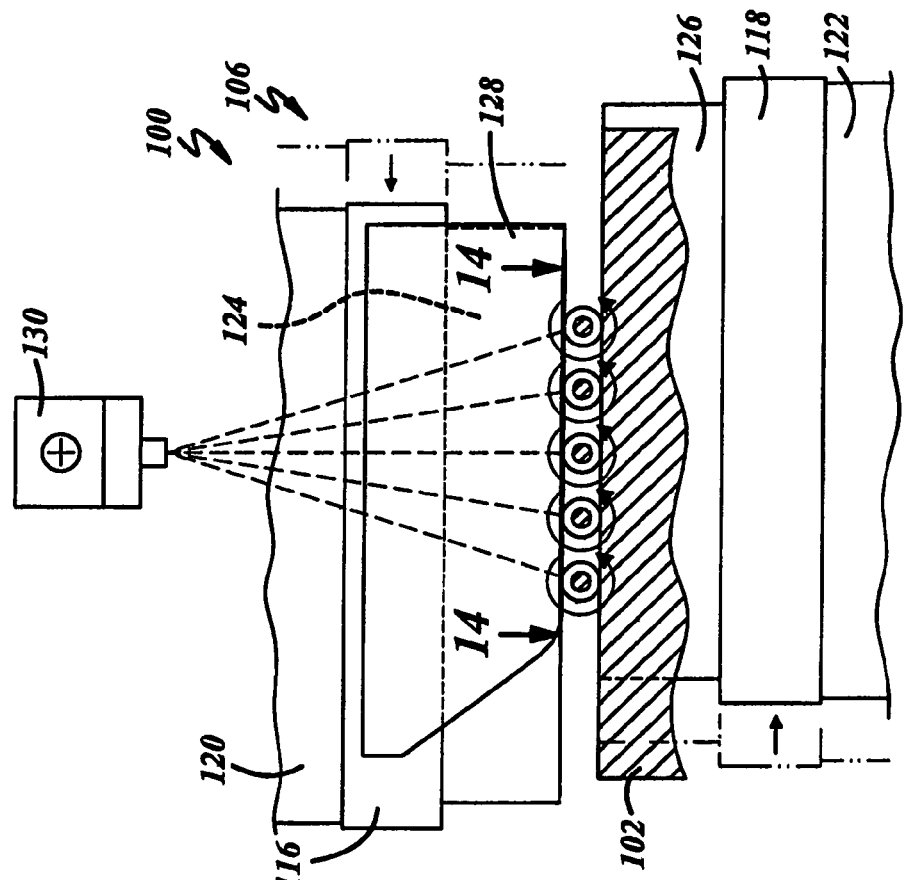
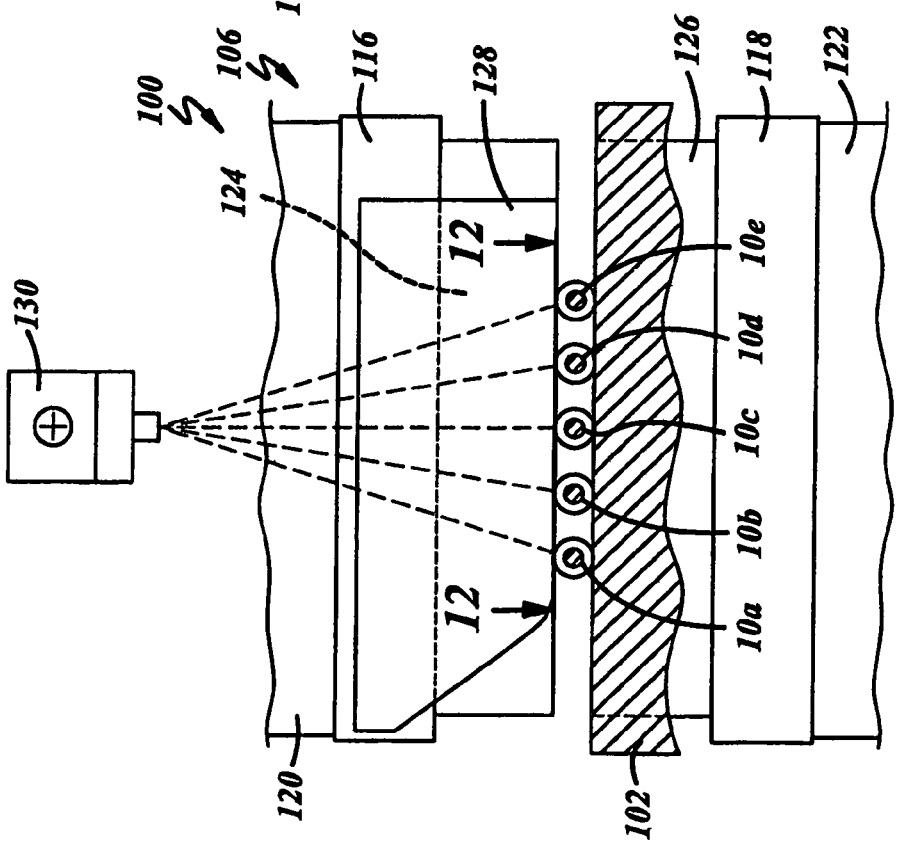

ELECTRIC WIRE INSULATION CENTER STRIPPING METHOD AND DEVICE

BACKGROUND OF THE INVENTION

This invention relates generally to stripping insulation from an insulated electric wire and more particularly to center stripping insulation from the insulated electric wire.

U.S. Pat. No. 3,953,706 (Harris et al.) discloses a device for laser stripping insulation from the end portion of an electric wire without damage to the conductor portion of the electric wire. The device includes a rotatable optical unit that produces a circumferential cut in the insulation. The device may be used to produce a longitudinal cut or a spiral cut that extends from the circumferential cut to the end of the electric wire.

U.S. Pat. No. 5,837,961 (Miller) discloses a laser stripping apparatus comprising a plurality of mirrors for alternatively directing a laser beam from a source over a first portion of an insulated electric wire and then an opposite portion of the insulated electric wire to permit removal of an end segment of the insulation as shown in the simplified system diagram of FIG. 1. The laser stripping apparatus is shown in detail in FIGS. 3-12 of the patent drawing. Column 9, line 59 through column 10, line 12 of the patent specification describes the laser stripping and removal of the end piece of insulation from the insulated wire 146 in connection with FIG. 7 of the patent drawing.

U.S. Pat. No. 6,326,587 (Candineau et al.) discloses an apparatus using a laser beam for removing or ablating an insulation layer from a center portion of an insulated electric wire as shown in FIGS. 5 and 6 of the Candineau et al. '587 patent. The laser beam ablates the insulation coating on one side of the exposed coil. According to the Candineau et al. '587 patent specification, sufficient light is transmitted past the insulated electric wire toward the opening by a reflector so that the insulating coating is virtually ablated from the opposite side of the exposed wire. See column 8, line 66 through column 8, line 2 of the Candineau et al. '587 patent specification.

SUMMARY OF THE INVENTION

This invention provides a method and devices for center stripping insulation from an insulated electric wire in which coordinated cuts are made in the insulation to remove a center portion of the insulation along the electric wire. The cuts are preferably made by a laser beam.

BRIEF DESCRIPTION OF THE DRAWINGS

FIG. 1 is a perspective view of an insulated electric wire that has been center stripped.

FIG. 2 is a perspective view of a device for center stripping an insulated electric wire;

FIG. 11 is a section taken substantially along the line 11-11 of FIG. 10 looking in the direction of the arrows;

FIG. 13 is a section similar to FIG. 11 showing parts of the second device in another operative position;

DETAILED DESCRIPTION OF THE PREFERRED EMBODIMENTS

FIG. 1 is a perspective view of an insulated electric wire 10 comprising a conductive core 12 that is surrounded by an insulation jacket 14 of thermoplastic material such as polyphenylene ether (PPE) compounds commonly used as cable insulation. Insulated electric wire 10 has been center stripped, that is a portion of insulation jacket 14 has been removed from a mid section of the insulated electric wire 10 to expose a portion 15 of the conductive core 12 with the insulation jacket 14 left intact on both sides of the exposed conductive core portion 15. This exposed portion 15 of the conductive core 12 may be used to make a splice connection to another electric wire without any need to cut off the electric wire 10 at the splice.

Figure 3:
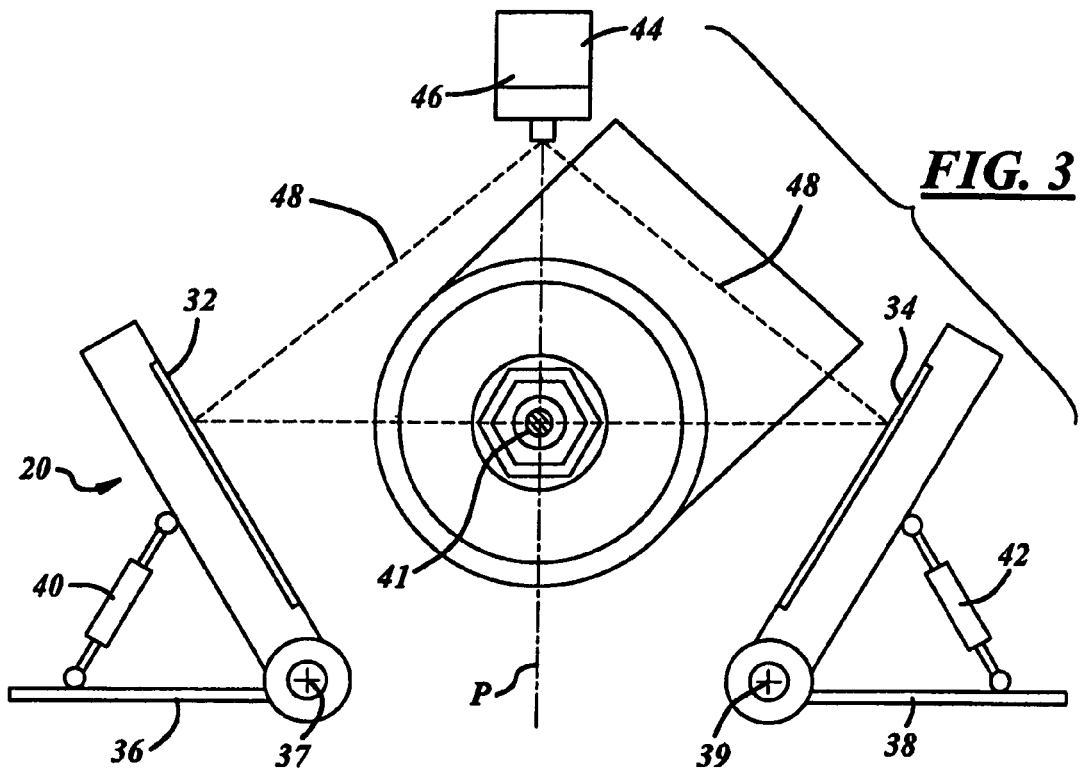
FIG. 3 is a vertical section taken through the device shown in FIG. 2.
Figure 9:
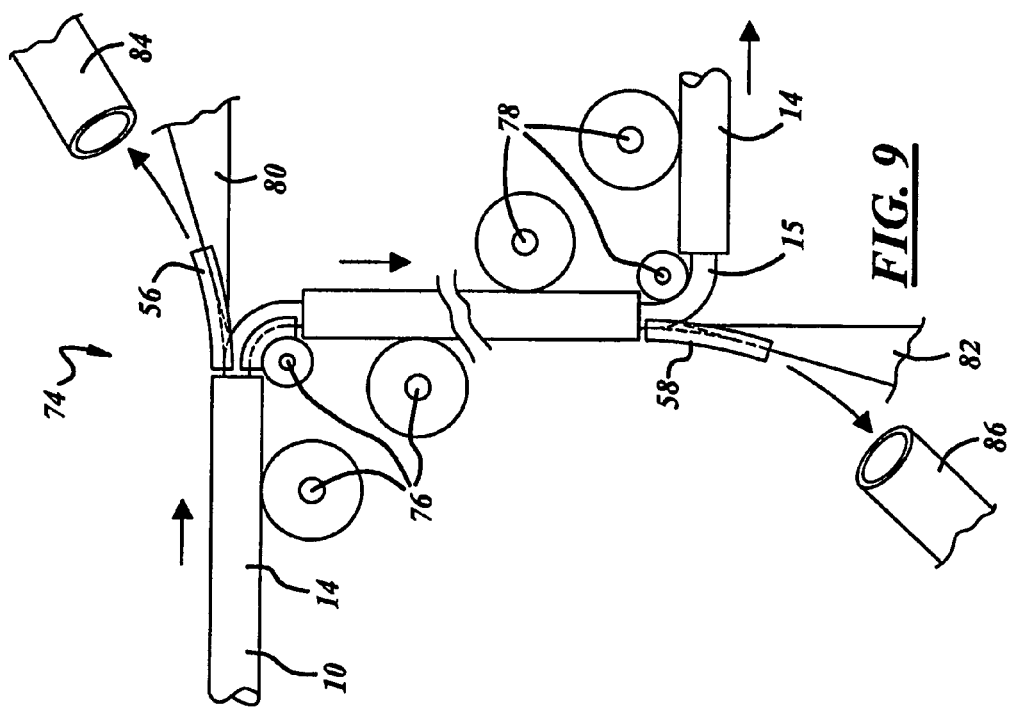
FIG. 9 is a schematic view of an insulation removal device.

FIGS. 2 and 3 disclose an "in-line" center stripping device 20 where insulated electric wire 10 is drawn through the center stripping device 20 longitudinally in any suitable manner. The insulated electric wire 10 is typically drawn off a supply drum (not shown) and sent through a wire straightener (not shown) before entering the center stripping device 20 at A. Upon exiting the center stripping device 20 at B, the insulated electric wire 10 is preferably fed through an insulation removal device as explained below in connection with FIG. 9.

The center stripping device 20 comprises longitudinally spaced exhaust tubes 24 and 26 that house respective coaxial mandrels 28 and 30 that are supported on columns 27 attached to a machine bed 29. The center stripping device 20 further comprises two reflecting mirrors 32 and 34 that are pivotally mounted on laterally spaced supports 36 and 38 that are secured to machine bed 29. The reflecting mirrors 32 and 34 pivot on axes 37 and 39 that are below and on opposite sides of a vertical center plane P through the axis 41 of coaxial mandrels 28 and 30. Adjustors 40, 42 such as hydraulic cylinders or ball screws, are attached to the respective mirrors 32 and 34 and to the laterally spaced supports 36 and 38 to adjust the tilt of the mirrors 32 and 34.

The center stripping device 20 further includes a laser beam generator 44 above the gap between the exhaust tubes 24 and 26. The laser beam generator 44 is preferably a laser marking head 46 that generates a laser beam 48 that is moved in a desired pattern.

Figure 4:
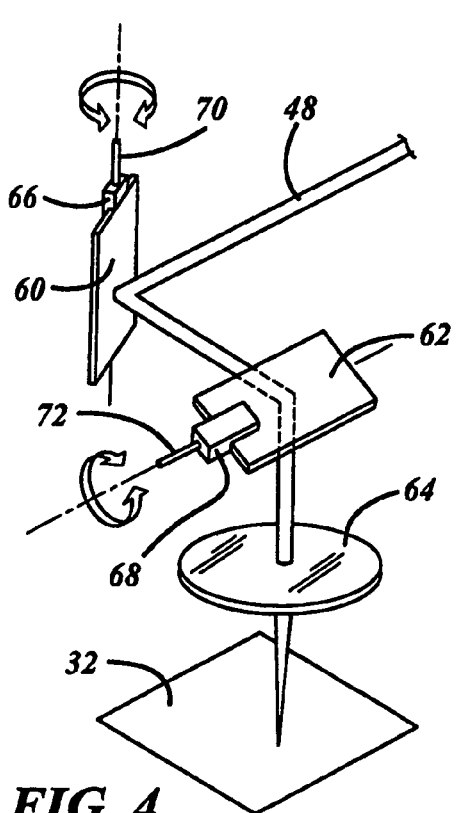
FIG. 4 is a schematic view of a laser marking head for the device shown in FIGS. 2 and 3.

Referring now to FIG. 4, the laser marking head 46 comprises two scan mirrors 60 and 62, and a focusing lens 64. The laser beam generator 44 generates a laser beam 48 that is reflected from scan mirrors 60 and 62 and directed through focusing lens (f-theta lens) 64. Galvanometers 66 and 68 (also called galvo-scanner motors) drive scan mirrors 60 and 62 about rotation axes 70 and 72 respectively. Galvanometers 66 and 68 are controlled by drive cards, an interface card and marking software (not shown) to reflect the focused laser beam 48 (that is directed through the focusing lens 52) in a desired pattern off either mirror 32 or mirror 34 and onto the insulation jacket 14 to cut through the insulation jacket.

The insulated electric wire 10 is held stationary in the center stripping device 20, while the laser beam 48 is directed toward the insulation jacket 14 of electric wire 10 in a pattern to center strip the insulation for removing a portion of the insulation jacket 14 and expose a portion of the conductive core 15 as shown in FIG. 1. The laser beam generation is controlled in a suitable manner to cut through the insulation jacket 14 without damage to the conductive core 12.

Figure 5:
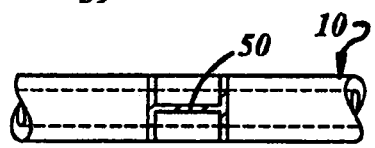
FIG. 5 is a side view of an insulated electric wire in the process of being center stripped.
Figure 6:
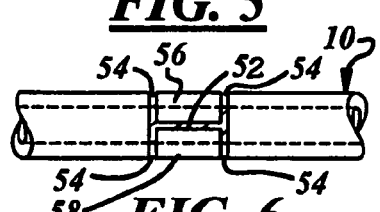
FIG. 6 is an opposite side view of the insulated electric wire in the process of being center stripped.
Figure 7:
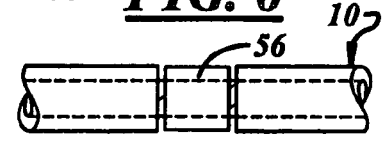
FIG. 7 is a top view of the insulated electric wire in the process of being center stripped.
Figure 8:
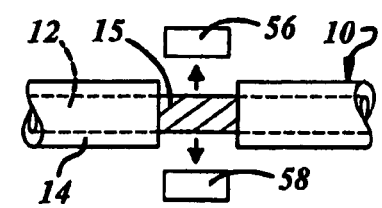
FIG. 8 is a side view of the insulated electric wire showing the center insulation slugs being removed.

The laser beam 48 is emitted from the laser beam generator 44 and directed to the insulation jacket 14 of the electric wire 10 via the two opposing reflecting mirrors 32 and 34 respectively. Each mirror is equipped with adjustor 40 or 42 that allows each mirror to be precisely positioned in order to direct the laser beam 48 to the insulation jacket 14 of the electric wire 10 at the proper elevation. The laser beam 48 is directed to one side (the left side as viewed in FIG. 3) of the insulation jacket 14 of the electric wire 10 via the first mirror 32. An "H" pattern 50 comprising semi-circular legs connected by an elongated cross bar, is cut through the insulation jacket 14 by the laser beam 48 that is re-directed off mirror 32 as shown in FIG. 5. The laser beam 48 is then directed to the opposite side (the right side as viewed in FIG. 3) of the insulation jacket 14 of the electric wire 10 via the second mirror 34. A second "H" pattern 52 is cut through the insulation jacket 14 of the electric wire 10 by the laser beam 48 as shown in FIG. 5. The second "H" pattern cut 52 is exactly opposite the first "H" pattern cut 50, that is, the "H" patterns are shaped and coordinated so that the four ends of the legs of the two "H" patterns meet at four locations 54 as shown in FIG. 5. These coordinated "H" pattern cuts result in two axially spaced circumferential cuts connected by two diametrically opposed axial cuts producing two insulation slugs 56 and 58 separated from each other by the elongated cross bars of the H pattern cuts 50 and 52. The two slugs 56 and 58 are then separated from the insulated electric wire 10 in any suitable manner. For instance, the slugs 56 and 58 may be removed by pulling the insulated electric wire 10 through the insulation removal device 74 that is shown schematically in FIG. 9.

Insulation removal device 74 comprises two sets of redirect rollers 76 and 78 that bend the insulated electric wire 10 at two successive right angles as the insulated electric wire is being pulled through the device. Insulation removal device 74 has knife edges 80 and 82 at the outside of the respective successive right angle bends, and preferably includes vacuum tubes 84 and 86 associated with the respective knife edges 80 and 82. Slug 56 is removed at the first right angle bend by knife edge 80 peeling slug 56 away from one side of the core 15 with the removed slug 58 preferably being carried away by vacuum tube 84. Slug 58 is then removed at the second right angle bend by knife edge 82 peeling slug 58 away from the opposite side of core 15 with the removed slug 58 preferably being carried away by vacuum tube 86.

While two "H" patterns are disclosed in discussing the preferred embodiment, other patterns are possible. For instance two patterns that result in axially spaced circumferential cuts connected by three or four generally axial cuts can be used. The cuts are preferably made by a laser beam because the possibility of any damage to the core 15 is avoided. Moreover, while each mirror 32 and 34 is illustrated as having x-axis adjustment, y and z axis mirror adjustments may be incorporated if necessary.

The insulated electric wire 20 is held preferably in a precise vertical and horizontal location by mandrels 28 and 30 having a hole diameter that is slightly larger than the diameter of the insulated electric wire that is being processed.

The exhaust tubes 24 and 26 are an optional point of use exhaust feature that is preferably incorporated into the center stripping device 20 so that the products of combustion resulting from a laser cut are easily and effectively removed from the laser work area.

Figure 10:
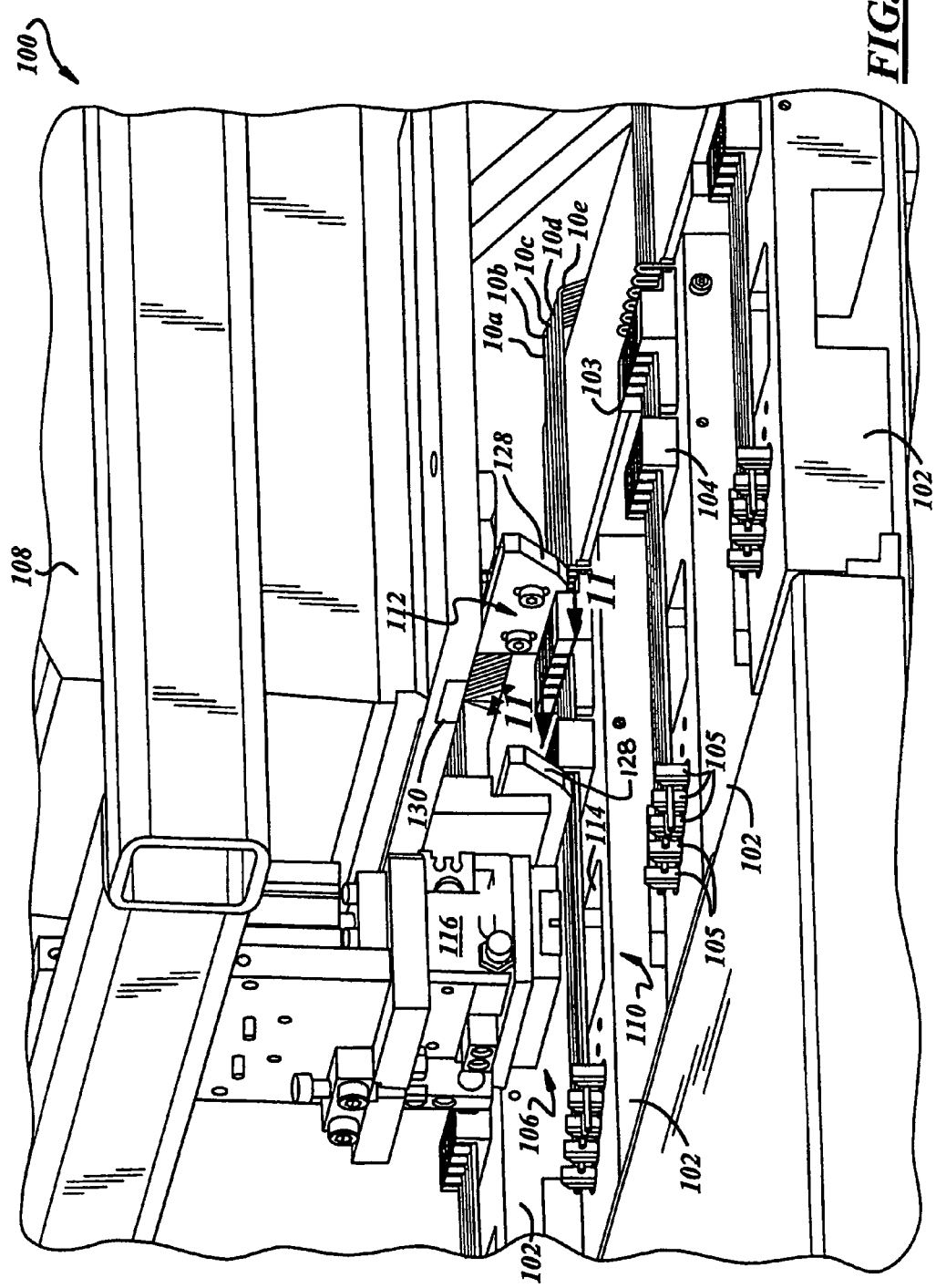
FIG. 10 is a perspective view of a second device for center stripping an insulated electric wire.

Referring now to FIG. 10, a second center stripping device 100 for center stripping the insulation jacket 14 to expose the conductive core 12 is illustrated. The center stripping device 100 comprises one or more transfer pallets 102. Each transfer pallet 102 has wire guides 103 and 104 and wire clamps 105 that hold a plurality of insulated electric wires 10a, 10b, 10c, 10d and 10e on fixed parallel axes corresponding to their respective longitudinal axes. When held, the individual insulated electric wires are rotatable about their respective axes. Transfer pallet 102 moves laterally into a work station 106 beneath a machine head 108. Work station 106 includes a multiple wire rotation device 110 and an insulation cutting device 112. Pallet 102 has a hole 114 aligned with the multiple wire rotation device 10 when the transfer pallet 102 is located in the work station 106.

The multiple wire rotation device 110 comprises an upper clamp 116 and a lower clamp 118 that are mounted on compound x and y slides 120 and 122 respectively as best shown in FIGS. 11 and 13. Clamps 116, 118 preferably include urethane pads 124, 126 respectively. When the transfer pallet 102 is moved into the work station 106, clamps 116 and 118 are moved vertically by the y-slides to compress simultaneously on the upper and lower surfaces of the insulated electric wires 10a, 10b, 10c, 10d, and 10e, that are held on pallet 102 as best shown in FIGS. 11 and 13. (The lower clamp 118 moves upward through hole 114 in pallet 102.)

The insulation cutting device 112 includes two spring biased pressure pads 128 and a laser beam generator, preferably a laser marking head 130, that are also lowered when clamps 116 and 188 are moved vertically. Spring biased pressure pads 128 engage the insulated electric wires 10a-10e fore and aft of the wire guides 103 and 104 respectively to hold the wires in the bottoms of the wire guides 103 and 104.

Figure 12:
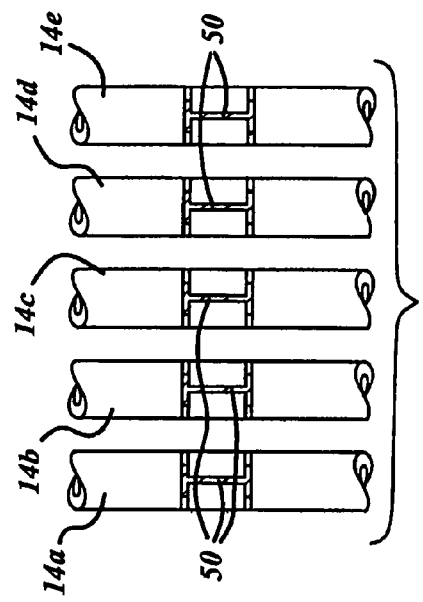
FIG. 12 is a top view of the insulated electric wires in the process of being center stripped by the second device.
Figure 14:
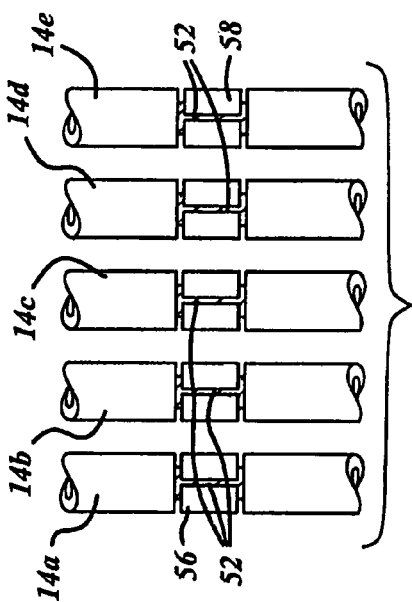
FIG. 14 is a top view of the insulated electric wires further in the process of being center stripped by the second device.

The laser marking head 130 then generates a laser beam directed toward the top sides of the respective insulation jackets 14a, 14b, 14c, 14d and 14e of the insulated electric wires 10a, 10b, 10c, 10d and 10e in succession so that an "H" pattern 50 is cut through each insulation jacket as best shown in FIGS. 12 and 14. This is preferably done at a very high rate of speed.

The multiple wire rotation device 110 is then activated so that the upper and lower clamps 116 and 118 are moved laterally in opposite directions by the x-slides, so that the insulated electric wires 10a-10e are rotated about their respective longitudinal axes 180 degrees with the top side now on the bottom and the bottom side now on top as best shown in FIG. 13.

The laser marking head 130 then generates a laser beam directed toward the bottom sides of the respective insulation jackets 14a, 14b, 14c, 14d and 14e of the insulated electric wires 10a, 10b, 10c, 10d and 10e (which are now on top) and the "H" pattern 52 is cut through each insulation jacket 14a-14e as best shown in FIG. 14. The second "H" pattern cut is exactly opposite the first cut, that is, the "H" pattern cuts are shaped and coordinated so that the four ends of the legs of the two "H" pattern cuts in each wire meet at four locations as in the case of the insulated wire 12 shown and described in connection with FIGS. 5-9. As before, these coordinated "H" pattern cuts result in two axially spaced circumferential cuts connected by two diametrically opposed axial cuts that produce two insulation slugs 56 and 58 separated by the cross bars of the H-pattern cuts 50 and 52. The two insulated slugs 56 and 58 are then separated from the insulated electric wires 10a-10e in any suitable manner.

Figure 15:
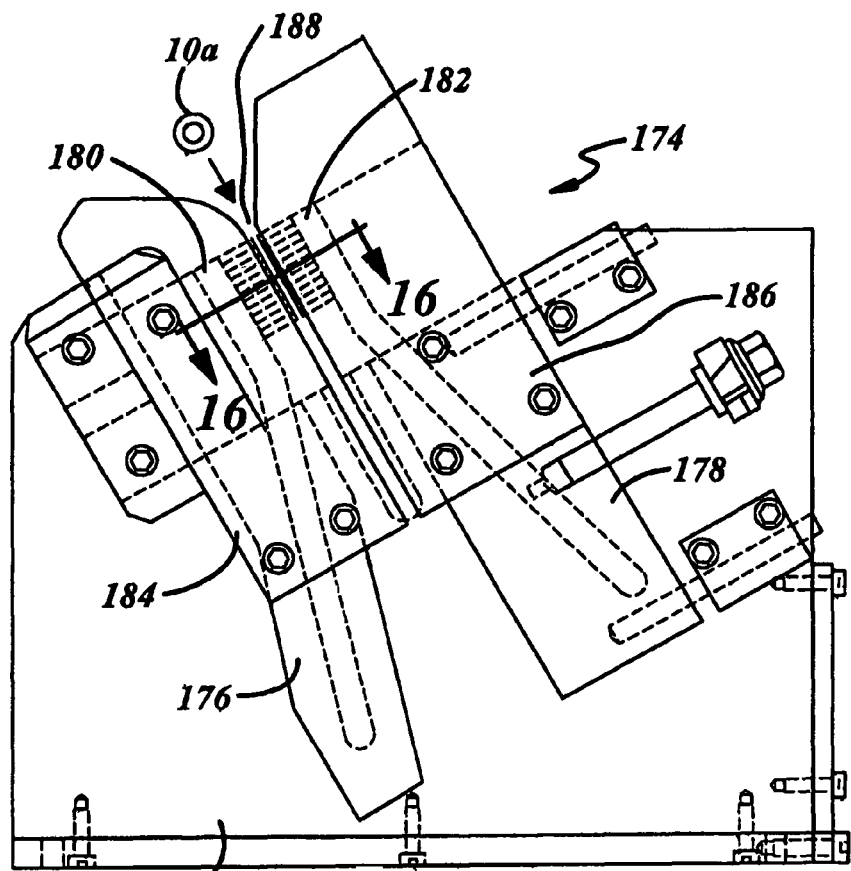
FIG. 15 is a front view of an offal removal assembly.
Figure 16:
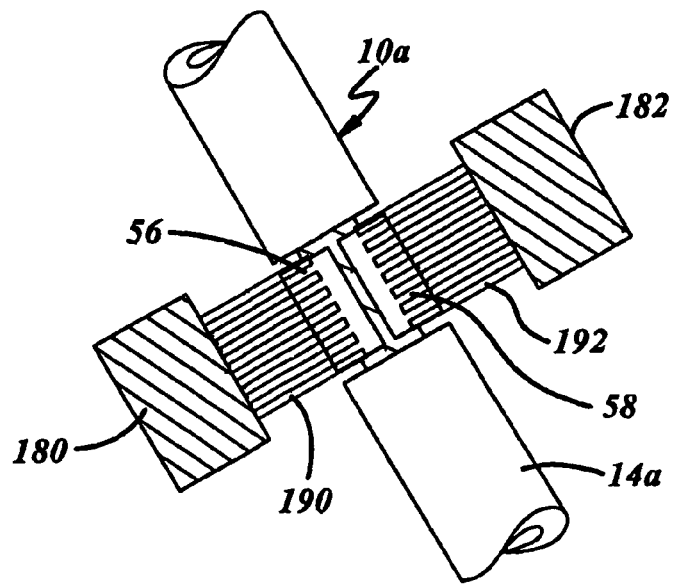
FIG. 16 is a partial section taken substantially along the line 16-16 of FIG. 15 looking in the direction of the arrows.

For instance, the slugs 56 and 58 may be removed by the offal remover assembly 174 shown in FIGS. 15 and 16. Offal remover assembly 174 comprises a support 175 with two brush holders 176 and 178 that hold brushes 180 and 182 respectively. Assembly 174 further includes wire guides 184 and 186 that are attached to the respective brush holders 176 and 178 to form a longitudinal channel 188 for an insulated electric wire, such as insulated electric wire 10a that has been center stripped to pass through. Brushes 180 and 182 have bristles 190 and 192 that project into the longitudinal channel 188. Bristles 190 and 192 engage opposite sides of the insulation 14a when the insulated electric wire 10a is pushed down through the channel 188 in a perpendicular orientation and strip away the insulation slugs 56 and 58. Bristles are preferably softer than the core 15 to avoid damage to the core. For instance, when the core is copper, bristles 190 and 192 may be brass. As indicated above, other cut patterns are possible. For instance two axially spaced circumferential cuts connected by three or four generally axial cuts can be used. However, the two "H" pattern cuts are preferred because it results in only two insulation slugs that need to be removed.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A device for stripping insulation from an insulated electric wire, comprising:

longitudinally spaced coaxial mandrels that are supported on columns attached to a machine bed;

two reflecting mirrors that are pivotally mounted on laterally spaced supports and that are secured to the machine bed so that the reflecting mirrors and pivot on axes that are below and on opposite sides of a vertical center plane P through the axis of the mandrel inserts;

adjustors attached to the respective mirrors and the laterally spaced supports and to adjust the tilt of the mirrors; and a laser beam generator above the coaxial mandrels positioned to reflect a focused laser beam off one of the two reflecting mirrors onto the insulation jacket to cut through the insulation jacket on one side of the insulated electric wire and reflect the focused laser beam off the other one of the two reflecting mirrors onto the insulation jacket to cut through the insulation jacket on an opposite side of the insulated electric wire.

2. The device of claim 1 wherein the laser beam generator is a laser that passes through a head.

3. A multiple wire rotation device comprising:

a pallet having wire guides and clamps for holding a plurality of electrically insulated wires for rotation about their respective longitudinal axes;

an upper clamp and a lower clamp that are mounted on compound x and y slides respectively for movement vertically and laterally with respect to the pallet;

the clamps including resilient pads respectively so that when the clamps are moved vertically by the y-slides, the clamps are adapted to compress simultaneously on the upper and lower surfaces of the plurality of insulated electric wires that are held on pallet; and the upper and lower clamps being moveable laterally in opposite directions to rotate the plurality of insulated electric wires about their respective longitudinal axes.

4. The combination of the multiple wire rotation device of claim 3 and an insulation cutting device that includes a laser beam generator that generates a laser beam that is directed toward the respective insulation jackets of the insulated electric wires sequentially so that an "H" pattern is cut through each insulation jacket, on the top side or the bottom side depending upon the positioning of the insulated electric wire by the multiple wire rotation device.

5. The combination as defined in claim 4 wherein the laser beam generator is a laser that passes through a head.

* * * * *